3,531,463
ENRICHMENT AND/OR SEPARATION OF AN ORGANIC COMPOUND BY ADSORPTION PROCESSES

Richard L. Gustafson, Horsham, Pa., assignor to Rohm & Haas Company, Philadelphia, Pa., a corporation of Delaware
No Drawing. Continuation-in-part of application Ser. No. 435,058, Feb. 24, 1965. This application Jan. 31, 1967, Ser. No. 612,771
Int. Cl. C07d 51/50; C07c 103/19
U.S. Cl. 260—211.5     15 Claims

ABSTRACT OF THE DISCLOSURE

Disclosed herein is a process for separating from an aqueous medium water-soluble substances having hydrophobic and hydrophilic portions in their molecules. The process involves contacting the aqueous medium with particles of a non-ionogenic, macroreticular water-insoluble cross-linked polymer of polymerizable ethylenically unsaturated molecules comprising about 2 to 100 weight percent of at least one polyvinylbenzene monomer selected from the group consisting of divinylbenzene, trivinylbenzene, alkyldivinylbenzenes having from 1 to 4 alkyl groups of 1 to 2 carbon atoms substituted in the benzene nucleus and alkyltrivinylbenzenes having from 1 to 3 alkyl groups of 1 to 2 carbon atoms substituted in the benzene nucleus.

CROSS-REFERENCES TO RELATED APPLICATIONS

This application is a continuation-in-part application of U.S. Ser. No. 435,058, filed on Feb. 24, 1965, and now abandoned.

BACKGROUND OF THE INVENTION

This invention relates to adsorption processes for the concentration, enrichment and/or separation of one or more components of an aqueous composition comprising an organic compound therein.

The process of the invention may be employed either (1) to separate one or more components in substantially pure form or condition from a mixture thereof or (2) to isolate fractions which are enriched as to one or another component, that is, the fractions contain one or more components in higher concentration. The use of the term "concentration" or other forms thereof is herein intended to cover both of these procedures in a generic fashion.

It is known to use ion-exchange resins to selectively absorb certain ionically charged substances from aqueous systems, the absorption being the result of ionic forces.

It is also known (Hwa-McBurney-Meitzner U.S. Pat. 2,974,178) that insoluble cross-linked addition polymer resins can be effectively employed to concentrate or separate a non-ionogenic organic compound in liquid phase from miscible mixtures thereof with other non-ionogenic liquids. The concentration or separation is based on selective or preferential imbibition or absorption by the resin of one of the liquids in the mixture apparently attributable to molecular forces of the Van der Waals' type rather than to ionic forces. By preferential absorption, it is meant that the resin absorbs a mixture of the components having a higher concentration of what may be termed the "preferentially absorbed" component that is present in the original liquid mixture applied to the resin. The resins therein involved have low surface areas from 0.1 to 0.001 square meter per gram of resin and the action depends on the fact that one of the materials to be separated from the other has a greater solvent or swelling capacity for the resin and hence is preferentially imbibed within the body of the resin. Many organic compounds cannot be effectively separated by such resins because they lack the capacity to be dissolved in, or to swell, the resin. This is particularly true of organic compounds having in their molecules at least two components of widely different polarity. In an extreme case of one simple type of compound, one of its components is quite hydrophobic in character, such as a hydrocarbon group or a halogen-containing hydrocarbon, and the other component is quite hydrophilic, such as a simple oxygen atom or a nitrogen atom, or a more complex group such as an ester linkage, a hydroxyl group, a polyalkoxyalkyl group having only 1 or 2 carbon atoms in each "alkyl" or alkoxy group, an amide group and so on. Such compounds ordinarily cannot swell or dissolve in the resin mass and since many compositions contain no material capable of swelling the resin, the process of this patent is of no use in concentrating or separating one component of such a mixture.

The present invention provides a process for the concentration or separation of an organic compound having portions in its molecule of widely different polarities in a composition containing it, such as an aqueous solution of the compound, which may or may not contain other substances dissolved therein. It may also be used to remove a water-immiscible organic compound, such as an oil, from aqueous systems in which the organic compound is dispersed, emulsified, or suspended. Concentration or separation of water-soluble organic materials from aqueous solvent systems constituted of a mixture of water and one or more water-miscible organic solvents, such as methanol-water, ethanol-water or acetone-water, may also be effected although the efficiencies of operation may generally be less than those obtained in a medium consisting of water alone. According to the present invention, there is used an essentially non-ionogenic, macroreticular, cross-linked polymer of condensation or addition type which is insoluble in the medium and is not appreciably swollen by the compound to be separated or concentrated. The macroreticular polymer, which under most conditions is of 16 to 100 mesh in particle size, but for some special purposes may be as small as about 400 mesh, has a porosity of at least 10% (percent volume of pores in the resin body or bodies) and a surface area of at least 10 square meters per gram of the resin (up to 2,000 square meters per gram).

In general, since these resins find their greatest value in the processing of aqueous solutions, they are preferably not extremely hydrophobic or water-repellent. The preferred resins are the cross-linked resins which have solubility parameters $$\left(\text{expressed in the units } \sqrt{\frac{\text{calories}}{\text{cubic centimeter}}}\right)$$

of at least about 8.5 and those having such parameters up to 15 or more are satisfactory for use in aqueous systems.

The process of the present invention accordingly involves a step of contacting the aqueous medium containing the dissolved water-soluble substance with the water-insoluble macroreticular resin in the form of particles, such as granules or beads, to adsorb the substance on the surface of the resin and subsequently desorbing the substance that is adsorbed in the first step.

The macroreticular resins employed as the adsorbents herein are not claimed as new compositions of matter in themselves. Any of the known materials of this type are suitable. For example, there may be used the granular cross-linked polymers of this character prepared by suspension polymerization of polymerizable ethylenically unsaturated molecules comprising about 2 to 100 weight percent of at least one poly(vinyl)benzene monomer selected from the group consisting of divinylbenzene, trivinylbenzene, alkyldivinylbenzenes having from 1 to 4 alkyl groups of 1 to 2 carbon atoms substituted in the benzene nucleus, and alkyltrivinylbenzenes having 1 to 3 alkyl groups of 1 to 2 carbon atoms substituted in the benzene nucleus. Besides the homopolymers and copolymers of these poly(vinyl)benzene monomers, one or more of them may be copolymerized with up to 98% (by weight of the total monomer mixture) of (1) monoethylenically unsaturated monomers, or (2) polyethylenically unsaturated monomers other than the poly(vinyl)benzenes just defined, or (3) a mixture of (1) and (2). In order to produce the high porosity and high specific surface areas required in the present invention, the suspension polymerization procedures of copending application for U.S. Pat. Ser. No. 749,526, filed July 18, 1958 and in the hands of a common assignee, may be employed and the entire disclosure of that application is incorporated herein by reference.

Examples of the alkyl-substituted di- and tri-vinyl-benzenes are the various vinyltoluenes, the divinylxylenes, divinylethylbenzene, 1,4 - divinyl - 2,3,5,6 - tetramethylbenzene, 1,3,5 - trivinyl - 2,4,6 - trimethylbenzene, 1,4-divinyl, 2,3,6 - triethylbenzene, 1,2,4 - trivinyl - 3,5 - diethylbenzene, 1,3,5-trivinyl-2-methylbenzene.

Examples of other polyethylenically unsaturated compounds include: divinylpyridine, divinylnaphthalenes, diallyl phthalate, ethylene glycol diacrylate, ethylene glycol dimethacrylate, divinylsulfone, polyvinyl or polyallyl ethers of glycol, of glycerol, of pentaerythritol, of monothio or dithio-derivatives of glycols, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N' - methylenediacrylamide, N,N' - methylenedimethacrylamide, N,N' - ethylenediacrylamide, trivinylnaphthalenes, and polyvinylanthracenes.

Examples of suitable monoethylenically unsaturated monomers that may be used in making the granular macroreticular resin of the latter type include: methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, and the corresponding esters of methacrylic acid, ethylene, propylene, isobutylene, diisobutylene, styrene, vinyltoluene, vinyl chloride, vinyl acetate, vinylidene chloride, acrylonitrile. Polyethylenically unsaturated monomers which ordinarily act as though they have only one such unsaturated group, such as isoprene, butadiene, and chloroprene, may be used as part of the monoethylenically unsaturated category.

A preferred proportion of the polyethylenically unsaturated compound of the cross-linking type is in the range of about 8 to 25% by weight of the total monomer mixture from which the resin is prepared. The suspension polymerization produces the resin in the form of granules or beads having an overall bead size in the range of about 0.1 to about 3 millimeters average diameter. The bead form of the resin is quite useful for the adsorption process of the present invention. In this process the material or substance being separated or concentrated is adsorbed on the surface of the resin particles and the effectiveness of the process depends on the presence of a high ratio of surface area to the weight of the resin. This is in distinct contrast to the absorption process of U.S. Pat. 2,974,178 mentioned above in which the resin particles are characterized by an extremely low ratio of surface area to weight (being only about 0.1 to 0.001 square meter per gram as compared to the range of 10 to 2,000 square meters per gram in the resins used in the present invention). The absorption process of the patent depends upon solvating or swelling action of the substances to be separated from the liquid medium upon the body of the resin. The substances to be separated in that patented process had, therefore, to be of a character which would swell the resin and be able to enter it. The substance of the type the present invention is adapted to separate could not be satisfactorily separated by the patented process because the portion of the substance having high hydrophilic character prevents any solvating action of the hydrophobic portion of the substance on the resin body. In other words, the great diversity in polarity between large components of the substance to be separated prevents that substance from solvating the resin body. Since the adsorption process of the present invention depends upon attraction of the substance to the surface of the resin (including the surface of the channels in each particle) and does not depend on solvation action of the substance to be sorbed on the resin sorbent, these materials or substances having great diversity of polarity in different portions of their molecules can readily be separated or concentrated by the present invention.

The adsorption process may be carried out in a simple batch operation or by a continuous procedure. In the batch operation, the resin adsorbent may be supported in a suitble adsorption cell or vessel which in most practical operations normally takes the form of a tower or column suitably packed with the resin particles which may be of any suitable size or mesh such as that which will pass through a 16-mesh screen but will largely be trapped by a 100-mesh screen (U.S. Standard). The liquid mixture is passed through the resin mass at a suitable rate, such as from top to bottom, or vice versa so that one of the components is adsorbed on the resin surfaces. Alternatively, the resin particles may pass in countercurrent relation to the liquid. For example, the particles may be continuously fed to the top of a column or tower into the bottom of which the liquid is fed continuously, the particles being removed from the bottom for subsequent treatment to remove or separate the substance adsorbed in any manner hereinbelow indicated, and the liquid issuing from the top being additionally treated, if desired, as indicated hereinafter.

If the mixture is a two-component mixture, say composed of A dissolved in B, of which A is preferentially adsorbed, B will issue from the resin until the limit of the adsorption capacity for A is reached after which the original mixture A and B will issue. B is, of course, collected separately. In this way, some pure B is obtained. When the limit of the adsorption capacity of the resin has been reached, excess liquid is removed by draining, centrifuging or the like, and then the adsorbed liquid is removed, such as by heating to distil, treatment with steam to effect steam distillation thereof, by extraction (leaching) or desorption with water, aqueous acid or alkaline solutions, such as an aqueous solution of caustic soda, acetic acid, hydrochloric acid, carbonic acid, and sulfuric acid, or an organic solvent which is easily separable by such means as fractional distillation, crystallization of one or the other liquid, or by any other procedure. Typical organic solvents include methanol, ethanol, propanol, isopropanol, benzene, xylene, cyclohexene, ethylacetate and the like. After separation of enriched A from the resin, the resin is ready for reuse. This batch-wise method therefore effects the separation of pure B and enrichment of A from the original A–B mixture.

A complete separation of the components from a mixture A–B may be effected by the use of a desorbent C in a continuous process. In a continuous procedure, which may also be called a cyclic process, the mass of resin supported suitably as in a tower or column may be fed alternately with the liquid mixture (say A and B again for simple illustration) and with a desorbent. The desorbent C is a solvent which is completely miscible with A and B at the operating temperature, which as stated before may be anywhere above the freezing point, and below the boiling point, of part or all of the liquids involved, and is preferably between 15° and 35° C. The desorbent used can be a single substance or it may be a liquid mixture of several compounds or it may be two or more liquids introduced in succession. Unless a mixture of C with one or the other or each of the components, e.g., A and B, is desired, the desorbent C should be readily separable from one or each of the components A and B as by fractional distillation, crystallization, or extraction so that one or both of A and B can be obtained in substantially pure form. In the continuous system, it is generally desirable at the start of the operation to fill the resin bed or column with the desorbent, then to introduce the liquid composition formed of components, e.g. A and B to be separated, and then to introduce alternately the desorbent and the composition.

The amount of liquid composition A–B that can be introduced or passed through a given weight of resin depends on the concentration of the preferentially adsorbed component such as compound A. The higher the concentration, the higher is the capacity.

The proportion of the desorbent C to be used depends on various factors including particularly the concentration of the component A or B that is preferentially adsorbed on the resin and the limit of the adsorption capacity of the resin for such component. The amount of desorbent can be readily determined in any particular system by simply supplying either an excess or deficiency of desorbent C after the introduction of an amount of mixture (A and B) which is within the separatory capacity of the resin and then introducing the second portion of mixture as would be done in normal operation. If an excess of desorbent is supplied, the effluent from the resin will change from a mixture of B and C to pure C, then to a mixture of A and C, then to C, then to a mixture of B and C, and so on. Each fraction is collected separately and the change from a mixture to pure C and from C to a mixture can be readily followed by suitable analyses as mentioned above, such as determination of refractive index at frequent intervals. The fraction of pure C discharged at alternate intervals can then be reduced, if desired, by introduction of smaller portions of C in the subsequent stages until the amount of pure C discharged between the discharge of mixtures is zero or negligible. On the other hand, if a deficiency of C is introduced, there will be no effluent portions made of pure C but the discharge of B and C will be followed by a mixture of A, B, and C before A and C is discharged. In this case, the amount of desorbent C is increased in subsequent stages until the mixture A, B and C disappears or its place is taken by a negligible amount of C. It is generally the case that the amount of desorbent added at each alternate stage is somewhat greater than the amount of mixture A and B added at each intervening stage. This, however, may have exceptions depending on the particular system. Like all other column operations, maximum efficiency is obtained at infinitesimal rates of pass. But for practical purposes, the speed of operation is increased. In the present case, rates at about 0.5 to 20 gallons of liquid per cubic foot of resin bed per minute (0.067 to 2.67 ml./cc./min.) are generally used. Generally an efficiency of operation in the range of 55 to 95% or more is attainable.

The separate portions of effluent collected, some of which contain, for example, A and C and others of which contain B and C in the example cited are then treated to separate component A or B, if either of these components are desired separate from the desorbent C. Such separation may be effected by any of the procedures mentioned in connection with the separation of the desired liquid component from the leaching effluent in the batch process, such as fractional distillation, freezing, crystallization, extraction, etc. In some instances, when the material adsorbed is an impurity and it is uneconomical to separate the adsorbed material from the resin, the spent resin may be discarded.

Besides the single contact or batch extraction and the continuous systems just described, the liquid under treatment may be passed in succession through a plurality of fixed beds of the copolymer adsorbent or through a plurality of beds thereof which are moved continuously or stepwise in countercurrent relation to the liquid. If desired, in any of these procedures, the liquid under treatment may be converted into vapor by distillation before contacting the copolymer adsorbent on which it is condensed to a distinct liquid phase coating the resin. Continuous extractive distillation procedures are particularly advantageous.

The present invention is particularly useful in separating from an aqueous solution an organic substance dissolved therein having a hydrophobic component and a hydrophilic component. Examples include the separation of surface active agents, detergents, emulsifiers and dispersants from aqueous solutions thereof, such as the wastes in various industrial plants including laundries, chemical manufacturers, dyers, canneries, etc. The process of the present invention may also be employed for the separation of steroids from aqueous solutions thereof, including aqueous solutions which contain impurities such as inorganic salts, e.g., sodium chloride, sodium sulfate, etc. The process is also effective for the separation of trypsin and other water-soluble enzymes, amino acids, polypeptides, proteins and hormones from aqueous solutions thereof.

This invention is particularly effective and valuable for the separation of biologically active or therapeutic materials from aqueous solutions. When so utilized, the materials obtained therefrom are substantially free of contaminants. Such a characteristic is especially important in the preparation of drugs where the presence of any contaminants may cause serious problems for the patient to which they are administered. Typical biologically active materials include vitamin B–12, tetracycline hydrochloride, oxytetracycline hydrochloride, penicillin, theophylline, pyrilamine, phenylpropanolamine, amphetamine sulfate, codeine phosphate, dilaudid, benadryl hydrochloride, ephedrine, sulfate, ergonovine maleate, methadone hydrochloride, morphine sulfate, trihexylphenidyl hydrochloride and other such materials which contain hydrophobic moieties, from inorganic ions or from other organic materials which have greater or lesser affinities for the adsorbent.

The adsorbents described in this invention may also be employed to effect the slow, sustained release of the adsorbed drugs when the adsorbent is administered internally or externally to a patient.

The present invention is also useful for the separation of fatty acids having from 1 to 10 carbon atoms from aqueous solutions thereof. Effective separation is obtained with the higher fatty acids even though they have but limited solubility in water. As the molecular weight of the fatty acid increases, the degree of adsorption increases. It may be employed for the decolorization of sugar and of other chemical products.

To assist those skilled in the art to practice the present invention, the following modes of operation are suggested by way of illustration, parts and percentages being by weight and the temperatures in degrees C. unless otherwise specifically noted.

(1)(a) A total of 180 mls. of a solution which contains 1 percent of sodium dodecylbenzenesulfonate (DBS) (and also 1 percent of other impurities, chiefly $Na_2SO_4$) is passed at room temperature through a 1 cm. (diameter) x 57 cm. (height) column containing 50 ml. of a copolymer of 50 percent divinylbenzene, 41 percent ethylvinylbenzene and 9 percent styrene at a flow rate of 0.067 ml./cc./min. (0.5 gal./ft.³/min.). The polymer has a surface area of 330 m.²/g., a porosity of 0.44 ml./ml. and a solubility parameter of about 9.1. Analysis of the effluent fractions shows that a total of 0.018 g. of the detergent is not adsorbed, indicating that 1.78 g. of 99 percent of the material is removed by the resinous material. Elution of the detergent is carried out with methanol. Eighty-six percent of the DBS is eluted in the first 1.2 bed volumes of effluent and ninety-six percent (1.71 g.) is eluted by passage of 2.0 bed volumes of methanol.

(b) One hundred bed volumes of a 500 p.p.m. DBS solution are passed at room temperature through a 50 ml. column of the resin employed above at a 0.2 ml./cc./min. (1.5 gal./ft.$^3$/min.) flow rate. A total of 2.16 grams or 88 percent of the detergent is adsorbed on the resin in the column. Regeneration of the resin with 30 bed volumes of 90° C. deionized water removes 0.97 g. or 45 percent of the DBS which had been previously adsorbed.

(c) One hundred bed volumes of a 500 p.p.m. DBS solution are passed through a 50 ml. column of a copolymer of 64 percent styrene, 20 percent divinylbenzene and 16 percent ethylvinylbenzene at room temperature at a 0.2 ml./cc./min. (1.5 gal./ft.$^3$/min.) flow rate. This polymer has a surface area of 106 m.$^2$/g., a porosity of 0.38 ml./ml., and a solubility parameter of about 9.1. A total of 1.43 grams or 57 percent of the DBS is adsorbed. Regeneration with 30 bed volumes of 90° C. water removes 1.17 g. or 82 percent of the adsorbed detergent.

(2)(a) Two hundred mls. of a solution which contains 10,000 p.p.m. each of sodium cholate and sodium chloride are passed through a 50 ml. column of the same resin as that used in (1)(a) above at room temperature at a 0.134 ml./cc./min. (1 gal./ft.$^3$/min.) flow rate. A total of 1.60 grams of sodium cholate, or 80 percent of the material passed through the column, is adsorbed. The resin is treated with one bed volume of water followed by one bed volume of ethanol at a 0.067 ml./cc./min. (0.5 gal./ft.$^3$/min.) flow rate. Eighteen percent of the steroid is eluted by the water whereas a total of ninety-seven percent is eluted after passage of the ethanol. Passage of an additional bed volume of ethanol removes an additional two percent of steroid. No measurable amount of chloride is detected in the ethanol fractions showing that an extremely efficient separation of sodium cholate from sodium chloride is achieved.

(b) One hundred mls. of a solution which contains 10,000 p.p.m. each of disodiumhydrocortisone-21-phosphate and sodium chloride are passed at room temperature through a 25 ml. column of the same resin used in part (a) hereof at a 0.134 ml./min. (1 gal./ft.$^3$/min.) flow rate. A total of 0.113 g. of steroid appears in the effluent showing that 0.887 g. remains on the column. The resin is treated with one bed volume of water followed by one bed volume of methanol at a 0.067 ml./cc./min. (0.5 gal./ft.$^3$/min.) flow rate. Thirty-seven percent of the steroid is eluted by the water whereas eighty-five percent is eluted after passage of the bed volume of methanol. After the passage of an additional bed volume of solvent, essentially all of the adsorbed steroid is eluted. No detectable salt is found in the methanol fractions.

(3)(a) A solution of 30 percent Philippino row cane sugar is passed through a 50 ml. column of the resin employed in (1)(a) above at room temperature at a 0.067 ml./cc./min. (0.5 gal./ft.$^3$/min.) flow rate. Eight bed volumes of sugar are passed before the color intensity of the effluent attains a value equal to 50 percent of that of the influent. At this point, 6.7 grams of sugar has been decolorized per gram of dry resin. Elution with one bed volume of acetone removes 95 percent of the absorbed color. In a similar experiment, 86 percent of the color bodies is removed by passage of a single bed volume of ethanol.

(b) Another sample of the above solution is passed through a 50 ml. column of the resin employed in (1)(a) above at a 0.067 ml./cc./min. (0.5 gal./ft.$^3$/min.) flow rate at 90° C. The average color removal upon treatment of five bed volumes of sugar solution is 65 percent. Regeneration at a 0.5 gal./ft.$^3$/min. flow rate with four bed volumes of 90° C. water removes 45 percent of the colored matter. Regeneration at 90° C. of similarly loaded columns with five bed volumes of 0.07, 0.10, 0.20 and 1.00 percent aqueous NaOH solutions removes 76, 84, 95 and 72 percent of the color bodies, respectively.

(4)(a) A dark brown (pH 1.2) solution which contains 0.67 percent lignosulfonates, 51.5 g./l. reducing sugars, 61.4 g./l. total solids and 3.3 g./l. ash is passed through a 50 ml. column of the resin employed in (1)(a) above at a 0.067 ml./cc./min. (0.5 gal./ft.$^3$/min.) flow rate at room temperature. After the passage of four bed volumes of solution, 97 percent of the colored material is removed. At the completion of the passage of nine bed volumes through the column, 90 percent of the color bodies is sorbed. The efficiency of color removal in the ninth bed volume is still 82 percent. Regeneration is carried out with a 1 percent aqueous solution of sodium hydroxide. Thirty-nine percent of the color bodies are removed after the passage of two bed volumes of regenerant. The regeneration efficiency reaches a 57 percent level upon the use of 12 bed volumes of caustic solution at which time methanol is employed as a regenerant. After the passage of three bed volumes of methanol, a total of 98 percent of the color bodies are removed. The passage of four additional bed volumes removes the last traces of color and restores the resin to its original white color.

(b) The same solution employed in part (a) hereof is passed through a 20 ml. column of the resin employed in (1)(c) above at a 0.067 ml./cc./min. (0.5 gal./ft.$^3$/min.) flow rate at room temperature. After the passage of three bed volumes of solution, 13 percent of the color bodies present in the influent solution are removed. After the treatment of six bed volumes, 22 percent of the colored material is adsorbed. Sixty-eight percent of the color present in the sixth bed volume is removed.

(5) 6.0 g. samples of a variety of hydrated resin beads are contacted with 50 mls. of a 30 percent aqueous solution of Philippino raw cane sugar for a period of thirty minutes at room temperature. The following Table I presents the degrees of sugar decolorization determined:

TABLE I

| Polymer [1] composition, wt. percent monomers | Surface area, m.$^2$/g. | Porosity, ml./ml. | Solubility parameter | Grams sugar decolorized per gram resin |
|---|---|---|---|---|
| (A) 50 DVB, 41 EVB, 9S | 330 | 0.44 | 9.1 | 2.55 |
| (B) 45 AN, 30 DVB, 25 EVB | 99 | 0.46 | 11.9 | 2.33 |
| (C) 64 MMA, 20 DVB, 16 EVB | 91 | 0.35 | 9.4 | 1.87 |
| (D) 64 AN, 20 DVB, 16 EVB | 39 | 0.45 | 13.1 | 1.36 |

[1] Key:
DVB is divinylbenzene.
EVB is ethylvinylbenzene.
S is styrene.
AN is acrylonitrile.
MMA is methyl methacrylate.

(6) The amounts of dodecylbenzenesulfonate (DBS) adsorbed from aqueous solution at room temperature by resins of varying structure at a point at which the concentration of DBS in the solution in equilibrium with the resin is 1 g./liter are given in Table II following:

TABLE II

Polymer: Grams DBS adsorbed per gram dry resin
A in Table I _____ 0.19
Same as in (1)(c) above _____ 0.08
3 DVB, 3 EVB, 94 S [1] _____ 0.056
C in Table I _____ 0.061
D in Table I _____ 0.018
B in Table I _____ 0.039

[1] See Key under Table I. This resin has a solubility parameter of 9.1, a surface area of 90 m.$^2$/g., and a porosity of 0.65 ml./ml.

The adsorption follows a linear Freundlich isotherm up to concentrations of approximately 5 g./liter. At higher concentrations the sorptive capacities of the resins increase rapidly, presumably due to micelle formation in the resin pores.

(7) The effect of increasing chain length upon the degree of adsorption is shown by a comparison of affinities of the resin described in (1)(a) above for propionic, butyric, and valeric acids. When 5 grams of resin are equilibrated at room temperature with 100 mls. of solution which initially contain 10 grams of fatty acid per liter, 0.04, 0.077 and 0.116 gram of acid is adsorbed per gram of resin in the cases of the propionic, butyric and valeric acids, respectively. In all cases the adsorption follows a linear Freundlich isotherm.

(8) When 50 ml. aliquots of aqueous solution which contain 45, 30, 20 and 10 mg. of trypsin are equilibrated with 0.5 g. of the resin described in (1)(a) above, 34, 21, 19 and 10 mg., respectively, are adsorbed by the resin at pH 7. The trypsin capacity increases with increasing pH and reaches a maximum at approximately pH 7.

(9) The amounts of p-tert-octylphenoxyethoxy(40) ethanol (OPE 40) adsorbed from aqueous solution at room temperature by various high surface area copolymers at a point at which the concentration of OPE 40 in solution in equilibrium with the resin is 10 g./liter are given in Table III following:

TABLE III

Polymer: Grams OPE 40 adsorbed per gram dry resin
A in Table I _____ 0.47
Same as in (1)(c) above _____ 0.14
C in Table I _____ 0.15
D in Table I _____ 0.09
B in Table I _____ 0.13

The degree of adsorption is found to increase with increasing temperature. The adsorption of p-tert-octylphenoxyethoxy(10)ethanol (OPE 10) is greater or equal to that obtained for OPE 40 in the majority of cases.

(10) 6.0 gram samples of the water-wet resin used in (1)(a) above (3.2 grams on a dry basis) are equilibrated with 100 mls. of 1 and 5 percent aqueous solutions of a ($C_{12}$–$C_{16}$) alkyldimethylbenzylammonium chloride. At equilibrium 0.19 and 1.31 grams of this quaternary ammonium compound are adsorbed per gram of resin from the 1 and 5 percent solutions, respectively.

Instead of the polymers of 2 to 100 weight percent of at least one poly(vinyl)benzene hereinbefore defined, there may be used as the adsorbents herein polymers of 2 to 100 weight percent of any of the other polyethylenically unsaturated monomers hereinbefore mentioned.

(11) Equilibrations of aqueous solutions of pyrilamine maleate (PYR), phenylpropanolamine (PPA) and theophylline (TH) with the resin used in part (1)(a) at room temperature show that 145, 126 and 120 milligrams of PYR, PPA and TH, respectively, are adsorbed per gram of dry resin at a point at which the concentration of the drug in the solution in equilibrium with the resin is 1 g./100 mls.

(12) In a chromatographic column having a diameter of approximately 0.5 inch, there is placed 50 ml. of the resin described in (1)(a). In another identical column, there is likewise placed 50 ml. of a cation exchange resin of the carboxylic type. The preparation of these carboxylic resins is set forth in detail in U.S. Pats. Nos. 2,319,359; 2,333,754; 2,340,110; and 2,340,111. One of these latter resins which is particularly preferred is commercially available as Amberlite IRC–50 from the Rohm & Haas Company, Philadelphia, Pennsylvania. A concentrate of vitamin B–12 is diluted with water to 15 p.p.m. and passed through each column at a flow rate of 1 gal./cu. ft./minute. The capacity of each resin to take up the vitamin B–12 is measured at two different points. The first is designated as breakthrough, that is, the point at which there is leakage from the column of vitamin B–12 at a 50% concentration. A second point of measurement is designated as the saturation point which is that point wherein the resin no longer takes up any more of the material being separated from the aqueous solution, which in this case is vitamin B–12. Thereafter, each of the columns is eluted with methanol at a flow rate of 0.5 gal./cu. ft./minute and the maximum or peak concentration of the vitamin B–12 during the elution is observed and noted. All of the above observations are shown in Table IV which clearly indicates the superiority of the non-ionogenic polymer resin over the carboxylic resin for separating vitamin B–12.

TABLE IV

| Resin Type | Resin capacity | | Elution | |
|---|---|---|---|---|
| | Breakthrough, mg./ml. | Saturation, mg./ml. | Peak concentration, p.p.m. | Volume, bed. vol. |
| Carboxylic | 0.03 | 0.14 | 150 | 5 |
| Non-ionogenic | 3.5 | 5.2 | 7200 | 2 |

(13) A 1000 p.p.m. aqueous solution of tetracycline hydrochloride is passed at a flow rate of 1.0 gal./cu. ft./minute through a chromatographic column approximately 0.5 inch in diameter and containing 50 ml. of the same type of resin employed in (1)(a). At the saturation point, 44 mg. of tetracycline hydrochloride is adsorbed per ml. of resin. After elution of the resin with five bed volumes of methanol, the effluent shows an elution peak of 30,000 p.p.m. of tetracycline hydrochloride. In a similar manner, an influent having 100 p.p.m. of tetracycline hydrochloride is passed through an identical column and resin at the same flow rate. In this situation, the saturation capacity is 7.4 mg. per ml. of resin. Likewise, an elution peak of 16,000 p.p.m. is observed during elution with three bed volumes of methanol.

(14) An aqueous solution of exytetracycline hydrochloride at a concentration of 100 p.p.m. is passed through a column and resin identical to that employed in (13) at a flow rate of 1.0 gal./cu. ft./minute. At the saturation point, 7.6 mg. of oxytetracycline hydrochloride of adsorbed per ml. of resin. Upon elution with two bed volumes of methanol, an elution peak of 17,600 p.p.m. is observed.

I claim:

1. A process for separating a dissolved water-soluble organic substance having a hydrophobic portion and a hydrophilic portion in its molecule from an aqueous medium containing it which comprises contacting the medium with particles of an essentially non-ionogenic, macroreticular water-insoluble head or suspension polymerized cross-linked polymer of polymerizable ethylenically unsaturated molecules comprising about 2 to 100 weight percent of at least one poly(vinyl)benzene monomer selected from the group consisting of divinylbenzene, trivinylbenzene, alkyldivinylbenzenes having from 1 to 4 alkyl groups of 1 to 2 carbon atoms substituted in the benzene nucleus, and alkyltrivinylbenzenes having from 1 to 3 alkyl groups of 1 to 2 carbon atoms substituted in the benzene nucleus, which polymer has a porosity of at least 10%, a surface area of at least 10 square meters per gram, is not appreciably swollen by the medium, and to the surface of which the substance is adsorbed.

2. A process according to claim 1 wherein the water-soluble substance is desorbed from the resin.

3. A process according to claim 2 wherein the water-soluble substance is desorbed from the resin by contacting said resin with a member selected from the group consisting of water, aqueous acid, alkaline solution or organic solvent.

4. A process according to claim 1 wherein the non-ionogenic, macroreticular polymer has a solubility parameter of at least 8.5.

5. A process according to claim 1 wherein the non-ionogenic, macroreticular polymer is in the form of beads having an overall bead size in the range of about 0.1 to 3 millimeters average diameter.

6. A process according to claim 1 wherein the non-ionogenic, macroreticular polymer contains about 8 to 25% by weight of polymerizable ethylenically unsaturated molecules of the cross-linking type.

7. A process according to claim 1 wherein the non-ionogenic, macroreticular polymer is a terpolymer of divinylbenzene, ethylvinylbenzene, and styrene.

8. A process according to claim 7 wherein the terpolymer comprises about 50% by weight of divinylbenzene.

9. A process according to claim 1 wherein the water-soluble substance is a biologically active material.

10. A process according to claim 9 wherein the biologically active material is desorbed from the resin.

11. A process according to claim 9 wherein the non-ionogenic, macroreticular polymer is a terpolymer of divinylbenzene, ethylvinylbenzene, and styrene.

12. A process according to claim 9 wherein the biologically active material is vitamin B-12.

13. A process according to claim 9 wherein the biologically active material is tetracycline hydrochloride.

14. A process according to claim 9 wherein the biologically active material is exytetracycline hydrochloride.

15. A process according to claim 2 wherein the water-soluble substance is desorbed from the resin by contacting the said resin with heat.

References Cited
UNITED STATES PATENTS

| | | |
|---|---|---|
| 2,830,933 | 4/1958 | Bouchard et al. |
| 2,996,430 | 8/1961 | Lightfoot. |
| 3,275,548 | 9/1966 | Walters _____ 210—24 |

LEWIS GOTTS, Primary Examiner

J. R. BROWN, Assistant Examiner

U.S. Cl. X.R.

210—24, 30, 40; 260—239.1, 256, 285, 286, 296, 501.1, 559, 570.5, 570.6

UNITED STATES PATENT OFFICE
CERTIFICATE OF CORRECTION

Patent No. 3,531,463            September 29, 1970

Richard L. Gustafson

It is certified that error appears in the above identified patent and that said Letters Patent are hereby corrected as shown below:

Column 7, line 2, "of" should read -- or --; line 49, "ml./min." should read -- ml./cc./min. --; line 60, "row" should read -- raw --. Column 10, line 38, "exytetracycline" should read -- oxytetracycline --; line 43, "of", first occurence, should read -- is --; line 52, "head" should read -- bead --. Column 12, line 4, "exytetracycline" should read -- oxytetracycline --.

Signed and sealed this 6th day of April 1971.

(SEAL)
Attest:

EDWARD M. FLETCHER, JR.            WILLIAM E. SCHUYLER, JR.
Attesting Officer                  Commissioner of Patents